United States Patent
Wei (10) Patent No.: US 9,544,005 B2
(45) Date of Patent: Jan. 10, 2017

(54) ADAPTABLE MOBILE PHONE CASE WITH BATTERY AND CHARGER

(71) Applicant: Lin L. Wei, Bristol, VA (US)

(72) Inventor: Lin L. Wei, Bristol, VA (US)

( * ) Notice: Subject to any disclaimer, the term of this patent is extended or adjusted under 35 U.S.C. 154(b) by 35 days.

(21) Appl. No.: 14/687,419

(22) Filed: Apr. 15, 2015

(65) Prior Publication Data

US 2016/0308569 A1 Oct. 20, 2016

(51) Int. Cl.
- *H02J 7/00* (2006.01)
- *H04B 1/3883* (2015.01)
- *H04M 1/04* (2006.01)
- *H04W 52/02* (2009.01)

(52) U.S. Cl.
CPC ........... *H04B 1/3883* (2013.01); *H02J 7/0045* (2013.01); *H02J 7/0047* (2013.01); *H02J 7/0052* (2013.01); *H04M 1/04* (2013.01); *H04W 52/0261* (2013.01); *H02J 2007/0049* (2013.01); *H02J 2007/0062* (2013.01)

(58) Field of Classification Search
CPC ..... H04B 1/3883; H02J 7/0045; H02J 7/0047; H02J 7/0052; H04M 1/04; H04W 52/0261
See application file for complete search history.

(56) References Cited

U.S. PATENT DOCUMENTS

| | | |
|---|---|---|
| 6,980,204 B1 | 12/2005 | Hawkins et al. |
| 7,489,952 B2 | 2/2009 | Simoes et al. |
| 8,712,486 B2 | 4/2014 | Sorias et al. |
| 9,049,283 B1 * | 6/2015 | Kim ......................... H04M 1/21 |
| 2004/0097256 A1 | 5/2004 | Kujawski |
| 2010/0124040 A1 | 5/2010 | Diebel et al. |
| 2013/0052871 A1 * | 2/2013 | Eklind ................... H02J 7/0042 439/620.21 |
| 2013/0150134 A1 | 6/2013 | Pliner et al. |
| 2014/0035511 A1 | 2/2014 | Ferber et al. |
| 2014/0192481 A1 | 7/2014 | Wojcik et al. |
| 2014/0202888 A1 | 7/2014 | Lieblein |
| 2014/0253032 A1 | 9/2014 | Bruwer et al. |
| 2014/0253038 A1 * | 9/2014 | Posa ...................... H02J 7/0044 320/111 |

(Continued)

OTHER PUBLICATIONS http://prefundia.com/projects/view/caseplug-usb-integrated-iphone-case/2366/, Caseplug USB Integrated I-phone case, Prefundia, Google search,Feb. 20, 2015, 28 pages.

(Continued)

*Primary Examiner* — Kashif Siddiqui
(74) *Attorney, Agent, or Firm* — IDP Patent Services; Olav M. Underdal (57) ABSTRACT

An adaptable mobile phone case includes a main body, a phone cavity, a rotatable power plug that functions as a stand, a storage compartment, a removable compartment lid with a credit card pocket, a phone charger module, a phone case holder with a hook, a mounting hole, an extension connection port, an external connection port, a removable battery, a plurality of battery LEDs, a communication module, a phone charger lock button, a manual switch charging button, a cable canal, a storage access aperture. The phone case allows easy charging of an installed mobile phone, with an additional battery, can store cables and credit cards, can stand on its own for self-photographs, and supports flexible mounting options.

27 Claims, 9 Drawing Sheets

(56) References Cited

U.S. PATENT DOCUMENTS

2014/0270234 A1 9/2014 Beal
2014/0306661 A1 10/2014 Rosenblum et al.

OTHER PUBLICATIONS

Matt Brandon, Review Ibattz MOJO Refuel Battery Case (I Phone 5), Mar. 11, 2014, 7 pages, The Digital Trekker.
http://www.prlog.org/12098282-odoyo-launches-ultra-fast-car-charger-with-built-in-lightning-connector-for-iphone-5.html.
,Odoyo Micro Car Charger with Lightning connector, Mar. 13, 2013, www.prlog.org, PRLog, Google search, 2 pages, Los Angeles, CA.
https://www.etsy.com/listing/157411637/mountable-pro-the-ideal-ios-wall-docking?ref=listing, Mountable Pro IOS Wall docking and charging solution, Etsy, Google Search, Feb. 20, 2015, 3 pages.

\* cited by examiner

FIG. 1

Adaptable Mobile Phone Case with Battery and Charger

ADAPTABLE MOBILE PHONE CASE WITH BATTERY AND CHARGER

CROSS-REFERENCE TO RELATED APPLICATIONS

N/A

FIELD OF THE INVENTION

The present invention relates generally to the field of mobile phone cases, and more particularly to methods and systems for mobile phone cases with inbuilt removable battery and charger.

BACKGROUND OF THE INVENTION

With the increasing proliferation of smart phones and increasing power consumption of large screen mobile phones, maintaining a charged state of a mobile phone, for example during travel, has become an increasing concern.

Generally, charging will require access to a 5 volt charging device and a charging cable. Which can be tedious to carry around. Sometimes a mobile phone may have access to a charging device or outlet, but lacks the cable needed to initiate charging.

Phone cases are available on the market that have inbuilt charging, and other phone cases support removable batteries. Yet, these solutions are not integrated, and generally prevent access to communication ports, and do not offer any space for storage of cables and other accessories.

As such, considering the foregoing, it may be appreciated that there continues to be a need for novel and improved devices and methods for maintaining a mobile phone in a charged state.

SUMMARY OF THE INVENTION

The foregoing needs are met, to a great extent, by the present invention, wherein in aspects of this invention, enhancements are provided to the existing model of charging cases for mobile phones.

In an aspect, the adaptable mobile phone case removes any need to remember to carry a charging cable. The adaptable mobile phone allows not only carrying and protecting a phone, but can also store a charging cable, and contains a built in AC charger and a external connection port, which for example can be a USB charger port.

In an aspect, the adaptable mobile phone case can include a rotatable power plug, which can rotate from a folded in position to a fully extended position;

In another aspect, the adaptable mobile phone case can include a storage compartment.

In yet another aspect, the adaptable mobile phone case can include a phone charger module, which charges a mobile phone in the phone case via a connection cable that is connected from the phone charger module to the mobile phone.

In yet another aspect, the adaptable mobile phone case can include an extension connection port, such that a phone connection cable can be connected to the mobile phone, such that the phone charger module is configured to charge the mobile phone.

In yet another aspect, the adaptable mobile phone case can include an external connection port, which is connected to the phone charger, such that the phone charger module charges the mobile phone with direct current provided via the external connection port and an external device can communicate with the mobile phone via the external connection port.

In yet another aspect, the adaptable mobile phone case can include a removable battery, which is mounted in the storage compartment, such that the removable battery is connected to the phone charger.

In yet another aspect, the adaptable mobile phone case can provide access to all buttons, input/output ports, and functions of the mobile phone or electronic device, which is inserted into the case.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of an adaptable mobile phone case 100 with reference to FIG. 1, in such manner that like reference numerals refer to like components throughout; a convention that we shall employ for the remainder of this specification.

Figure 1:
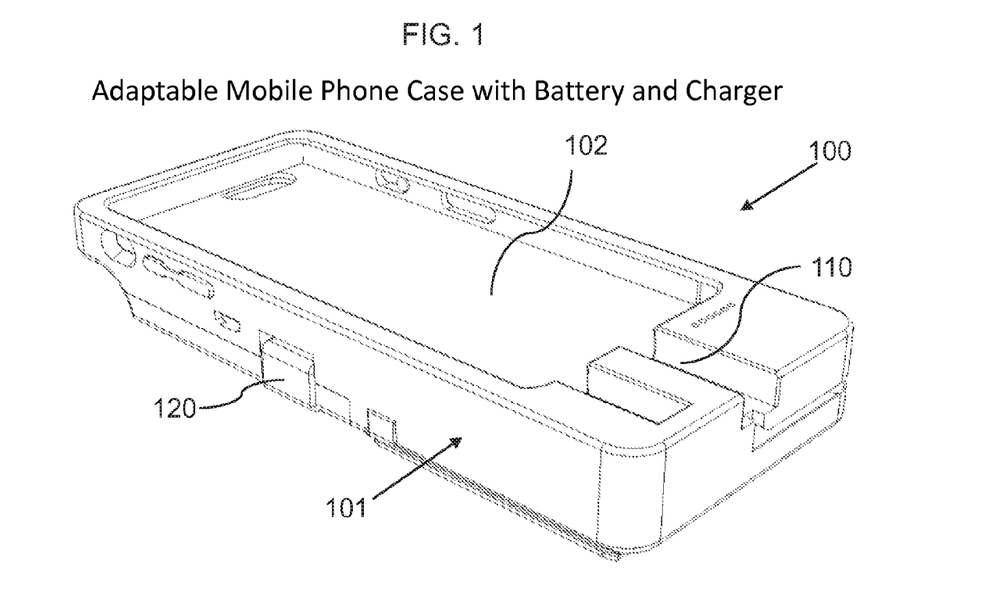
FIG. 1 is a front perspective view of an adaptable mobile phone case, according to an embodiment of the invention.

In an embodiment, as shown in FIG. 1, an adaptable mobile phone case 100 for carrying a mobile phone or other mobile device, can include:
 a. a main body 101, of the phone case 100;
 b. a phone cavity 102, which is a cavity in a front of the main body 101, for containing the mobile phone;
 c. a phone connection aperture 110, which is an aperture from an outer surface of a lower end of the phone case 100 to the phone cavity 102, such that the phone connection aperture 110 can be configured to allow connecting a charger and data connection cable, also called a phone connection cable, to a lower end of the phone;
 d. a rotatable power plug 120, mounted on a rear left side of the phone case. The power plug 120 is here shown partially visible, folded in to the phone case 100.

Figure 2:
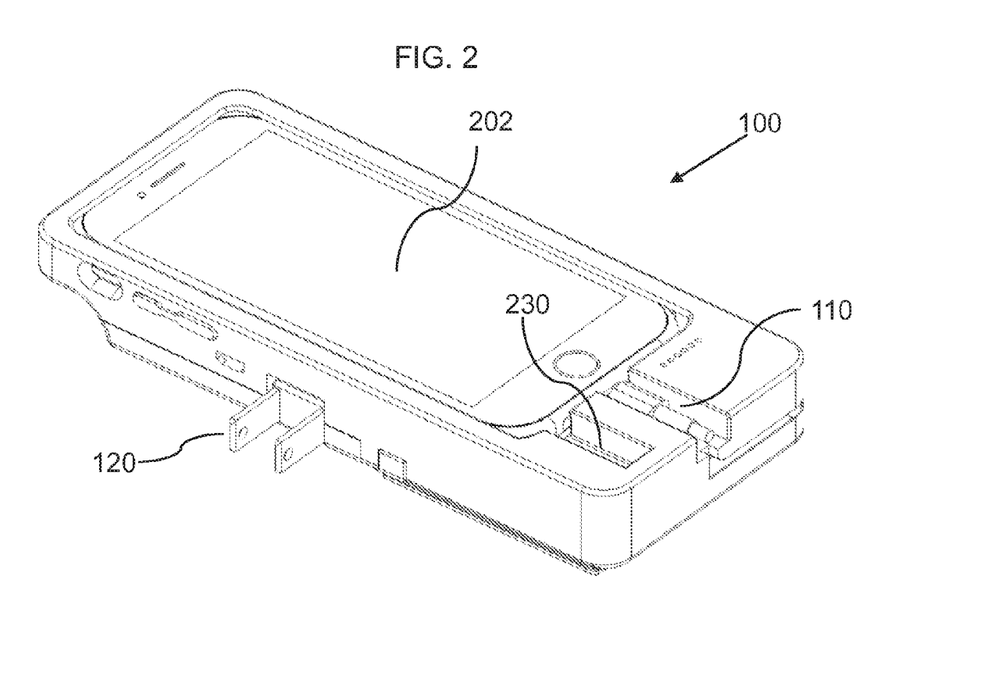
FIG. 2 is a front perspective view of an adaptable mobile phone case with a phone inserted, according to an embodiment of the invention.

In a related embodiment, FIG. 2 shows the adaptable mobile phone case 100 with a mobile phone 202 inserted, and the rotatable power plug 120 rotated to a fully open position for insertion into an outlet for charging. Thereby, FIGS. 1 and 2 show that the rotatable power plug 120 is configured to rotate from a folded in position to a fully open position.

In related embodiments, the mobile phone 202, can be a mobile phone, or any other mobile device, such as a music player, a tablet device, a personal digital assistant, a point-and-shoot camera, etc.

Figure 3:
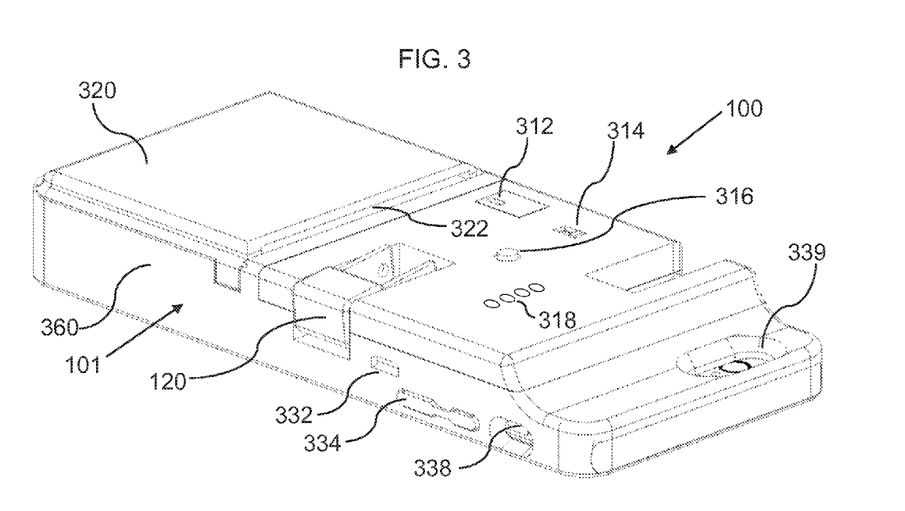
FIG. 3 is a rear perspective view of an adaptable mobile phone case, according to an embodiment of the invention.
Figure 6:
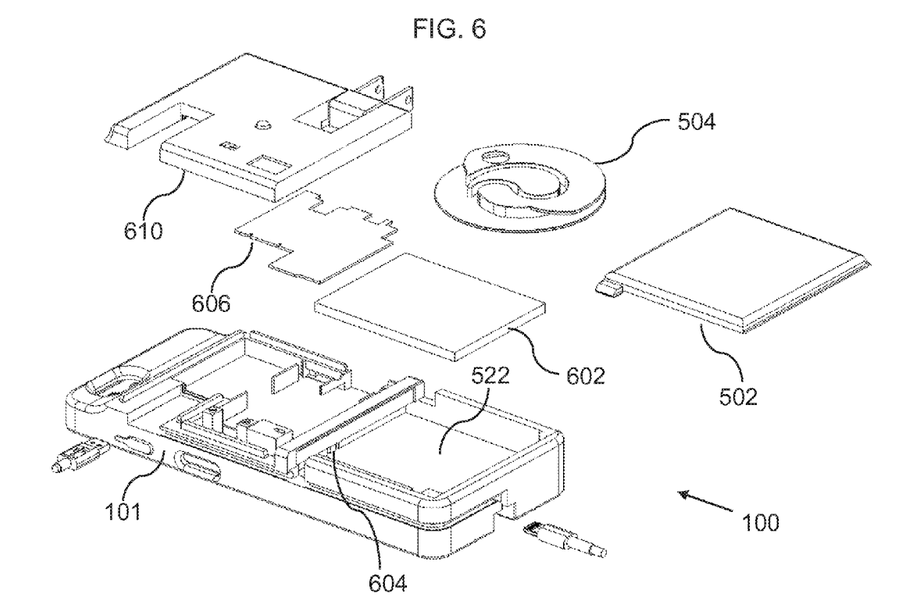
FIG. 6 is a rear perspective view of an adaptable mobile phone case in a partially exploded view, according to an embodiment of the invention.

In a further related embodiment, as shown in FIG. 3, the adaptable mobile phone case 100 can further include:
 a) A mounting hole 312 for inserting a hook from a phone case holder, to allow attachment of the phone case 100 to a car window or other surface;
 b) A phone charger lock button 314, which when in on position prevents charging of the internal battery in the mobile phone when the power plug 120 is connected to an AC outlet, and simultaneously allows data to be synced via the charger port;
 c) A manual switch charging button 316, which when pressed configures the phone case to charge a removable battery 602, shown on FIG. 6, which is stored and connected inside the phone case 100; and
 d) A removable compartment lid 320, which covers a storage compartment, which is a cavity on a rear side of the main body 101, the compartment lid further comprising a credit card pocket 322, configured as a flat cavity inside the compartment lid 320, with a narrow elongated aperture in a side of the compartment lid 320, configured to allow entry of a plurality of credit cards into the credit card pocket 322.
 e) An external connection port 332, which can allow charging of the phone and removable battery, and also allow connection synchronization and control of phone 202 which is inserted and connected to the phone case 100;
 f) An external volume adjust button 334, which is configured to press on a phone volume adjust button on a mobile phone 202 that is installed inside the phone case 100;
 g) A silence button opening 338, which is an opening in a side of the phone case 100, configured to allow access to a silence button on a mobile phone 202 that is installed inside the phone case 100;
 h) A rear camera opening 339 which is an opening in a rear of the phone case 100, configured to allow use of a rear camera and flash on a mobile phone 202 that is installed inside the phone case 100.

Figure 4:
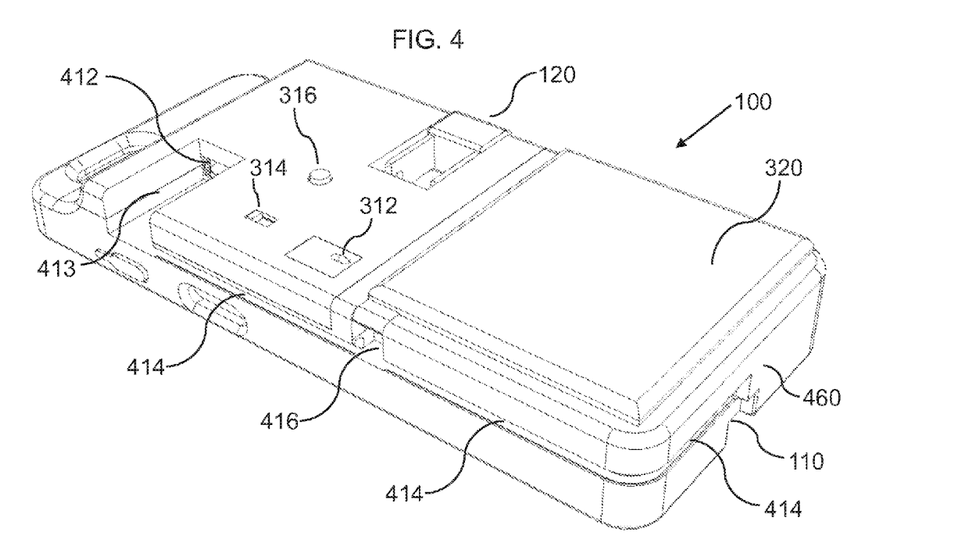
FIG. 4 is a rear perspective view of an adaptable mobile phone case, according to an embodiment of the invention.

In a further related embodiment, as shown in FIG. 4, the adaptable mobile phone case 100 can further include:
 a) An extension connection port 412, such that a phone connection cable can be inserted into an extension connection aperture 413 to be connected with the extension connection port 412;
 b) A cable canal 414, extending along a side of the phone case 100, from the extension connection aperture 413 to the phone connection aperture 110, such that a phone connection cable can be connected from the extension connection port 412 to a connection point on a lower end of a phone which is positioned by the phone connection aperture 110, such that the cable fits snugly in the cable canal 414. Excess length of cable can be inserted in a storage compartment inside the phone case 100, via a storage access aperture 416.

In a related embodiment, as shown in FIG. 3, the external connection port 332 can be a female micro USB port, which can include a micro-A and micro-B port. In other embodiments, it can be another type of female/receptacle connection port for charging and communication, including other types of USB ports, a Lightning port, etc.

In a related embodiment, as shown in FIG. 4, the extension connection port 412 can be a female standard-A USB port. In other embodiments, it can be another type of female/receptacle connection port for charging and communication, including other types of USB ports, a Lightning port, etc.

Figure 5:
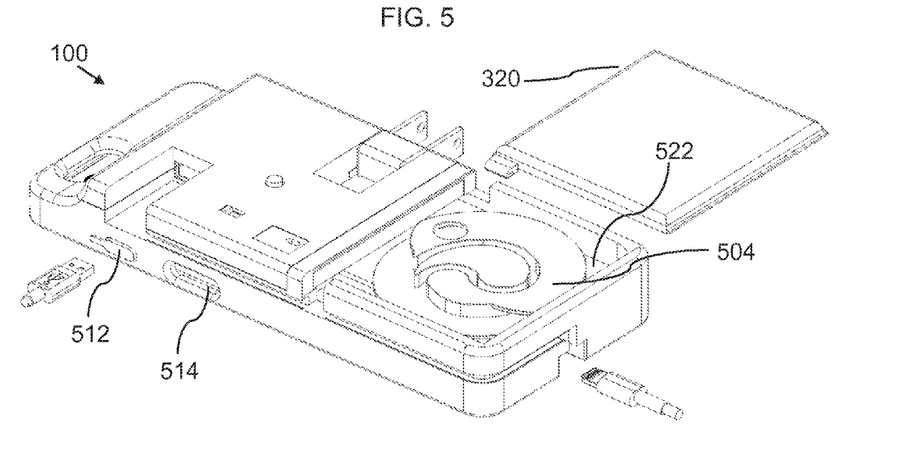
FIG. 5 is a rear perspective view of an adaptable mobile phone case, according to an embodiment of the invention.

In a further related embodiment, as shown in FIG. 5, the adaptable mobile phone case 100 can further include:
 a. A storage compartment 522, which can be covered by the compartment lid 320, and can be used for storing phone connection cables and other accessories;

b. A cable holder plate 504, which is configured to allow tight wrapping of a phone connection cable, such that the cable holder plate 504 with a phone connection cable can fit inside the storage compartment 522.;

c. A sim holder opening 514, to allow removal and insertion of a sim card from a phone that is installed inside the phone case 100;

d. A case screen on/off button 512, which is configured to press on a phone screen on/off button on a mobile phone 202 that is installed inside the phone case 100;

In a further related embodiment, as shown in FIG. 6, showing an exploded view of parts of the phone case 100, the adaptable mobile phone case 100 can further include:

a. A case cover 610, which is attached to a rear side of the phone case 100, to cover internal components of the phone case 100;

b. A main body 101, such that the case cover is attached on a rear side of the main body 101;

c. An external removable battery 502, which inserted into the bottom of the storage compartment 522, such that the storage compartment 522 is configured with electronic contacts 604, to establish an electronic contact with the battery 502; and d. An electronic circuit module 606, which normally is implemented as a printed circuit board that is populated with connected electronic components, such that the electronic circuit module 606, is configured to control charging and control functions of the phone case 100.

Figure 7:
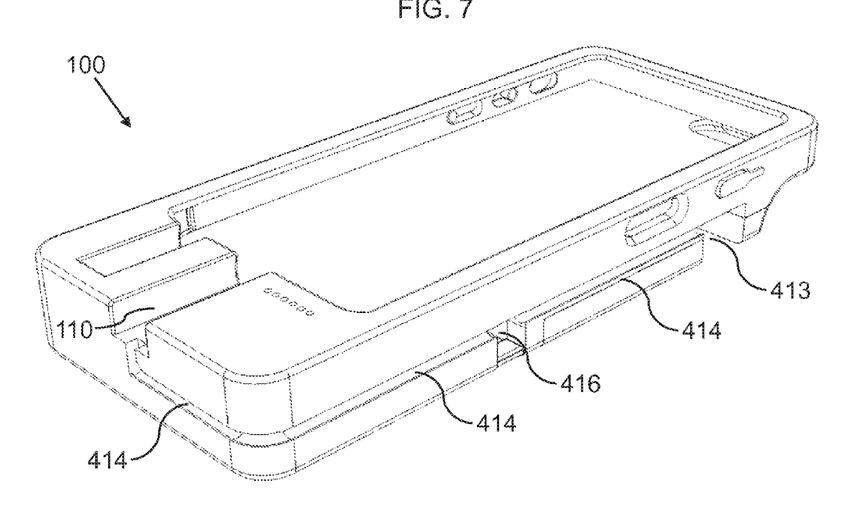
FIG. 7 is a front perspective view of an adaptable mobile phone case, according to an embodiment of the invention.

FIG. 7 shows an alternative view of the cable canal 414, extending along a side surface and a bottom surface of the phone case 100, from the extension connection aperture 413 to the phone connection aperture 110, such that a phone connection cable can be connected from the extension connection port 412, as shown in FIG. 4, to a connection point on a lower end of a phone which is positioned by the phone connection aperture 110, such that the cable fits snuggly in the cable canal 414. Excess length of cable can be inserted in a storage compartment inside the phone case 100, via a storage access aperture 416.

Figure 8:
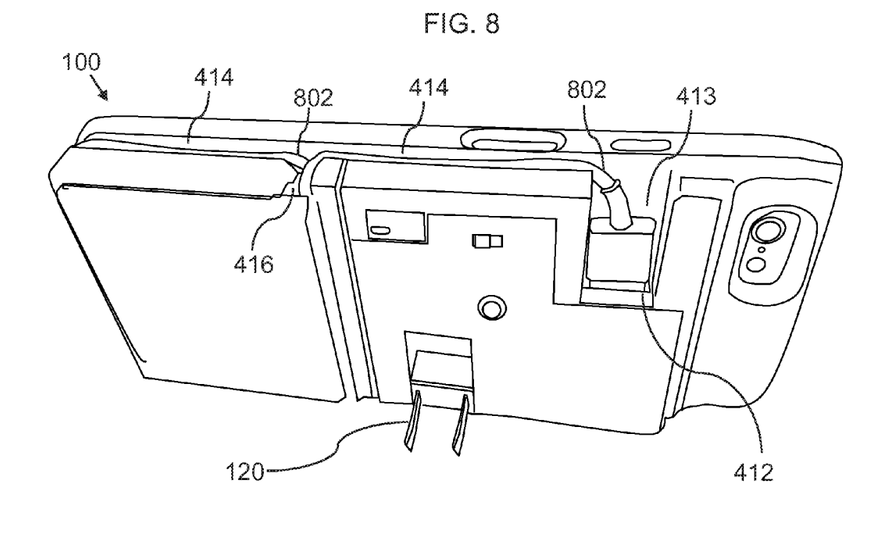
FIG. 8 is a rear perspective view of an adaptable mobile phone case, according to an embodiment of the invention.

In a related embodiment, FIG. 8 shows a phone connection cable 802, connected to the extension connection port 412, and then via the extension connection aperture 413 continuing along the cable canal 414, with excess length of cable 802 inserted into the storage compartment 522, via the storage access aperture 416.

In a related embodiment, as shown in FIG. 8, the power plug 120 can be partially rotated, to about 40 degrees, such that the power plug 120 can be used as a stand, to allow the phone case to rest at a leaning angle for viewing the phone 202 inside the phone case 100.

Figure 9:
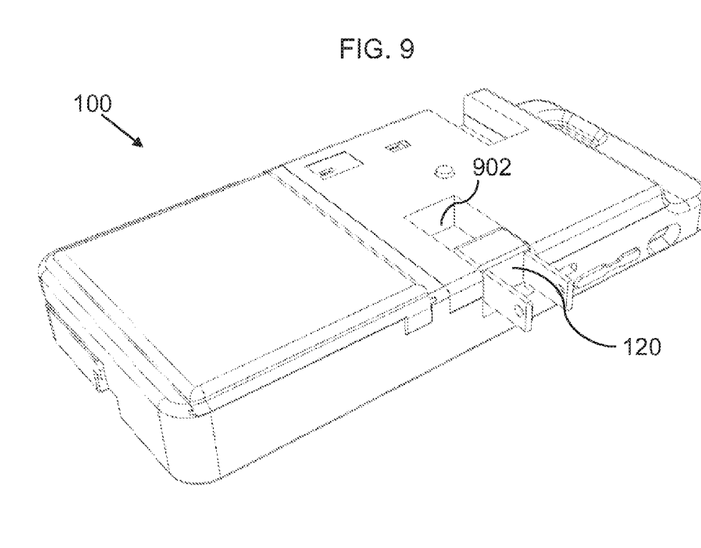
FIG. 9 is a rear perspective view of an adaptable mobile phone case, according to an embodiment of the invention.

In a related embodiment, as shown in FIG. 9, the rotatable power plug 120, can be rotationally connected in an outer end of a plug cavity 902, in the rear side of the phone case 100, such that the plug can be rotated into the plug cavity 902, at a zero rotation degree. The plug is seen here in a fully extended state, rotated 180 degrees, such that the plug 120 is extending away from a side of the case 100, in a configuration suitable for insertion into an AC outlet, with minimal space needed, allowing space for other plugs to be inserted into adjacent outlets.

Figure 10:
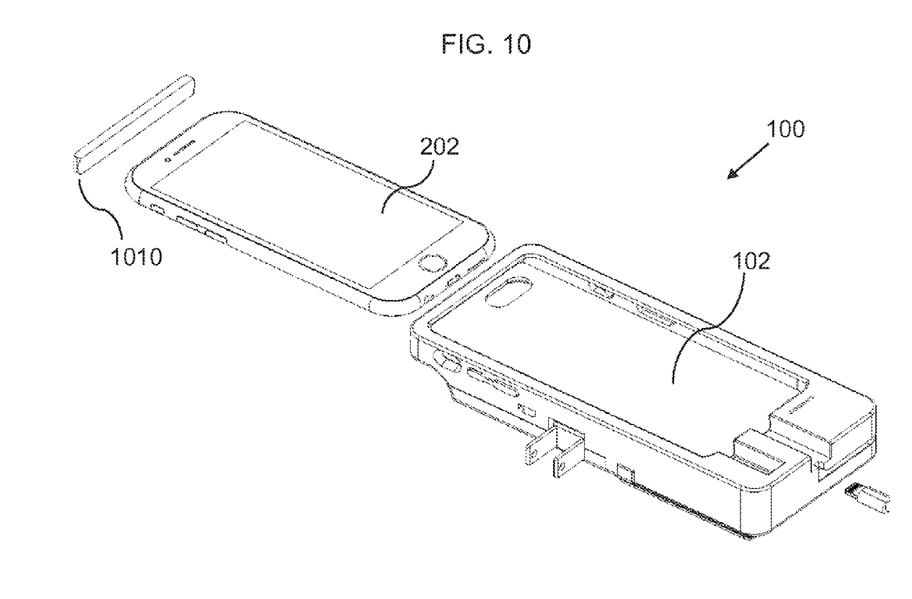
FIG. 10 is a front perspective view of an adaptable mobile phone case, showing a mobile phone to be inserted, according to an embodiment of the invention.
Figure 15:
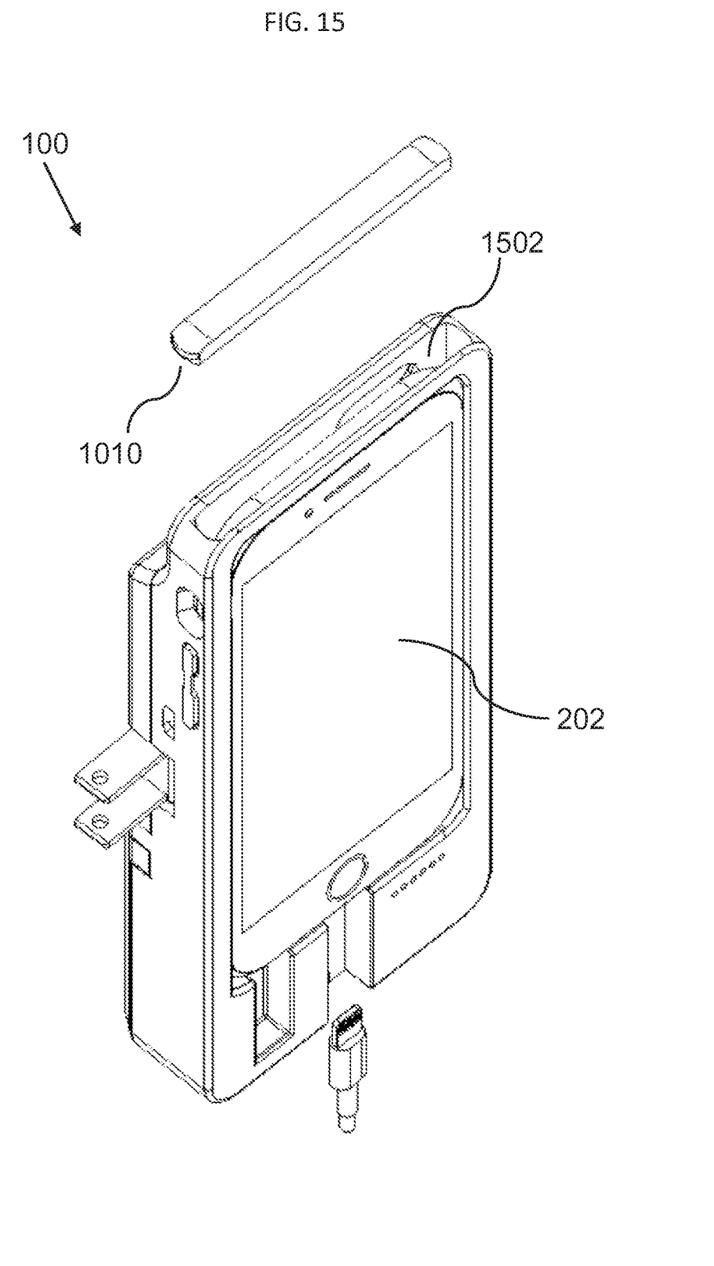
FIG. 15 is a front perspective view of an adaptable mobile phone case, showing a mobile phone that has been inserted, according to an embodiment of the invention.

In a related embodiment, as shown in FIG. 10, the phone case 100 can further include a removable top side cover 1010, which can be attached over a top side aperture 1502, shown in FIG. 15, in the top side of the phone case 100, wherein the top side aperture allows a mobile phone 202 to slide in to the phone cavity 102.

Figure 11:
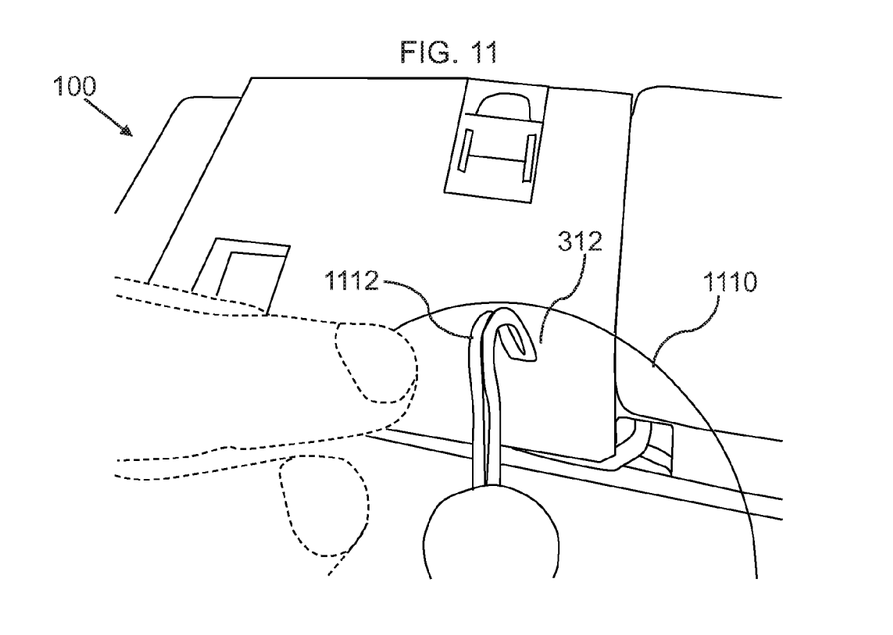
FIG. 11 is a rear perspective view of an adaptable mobile phone case, showing insertion of a hook for a phone case holder, according to an embodiment of the invention.
Figure 12:
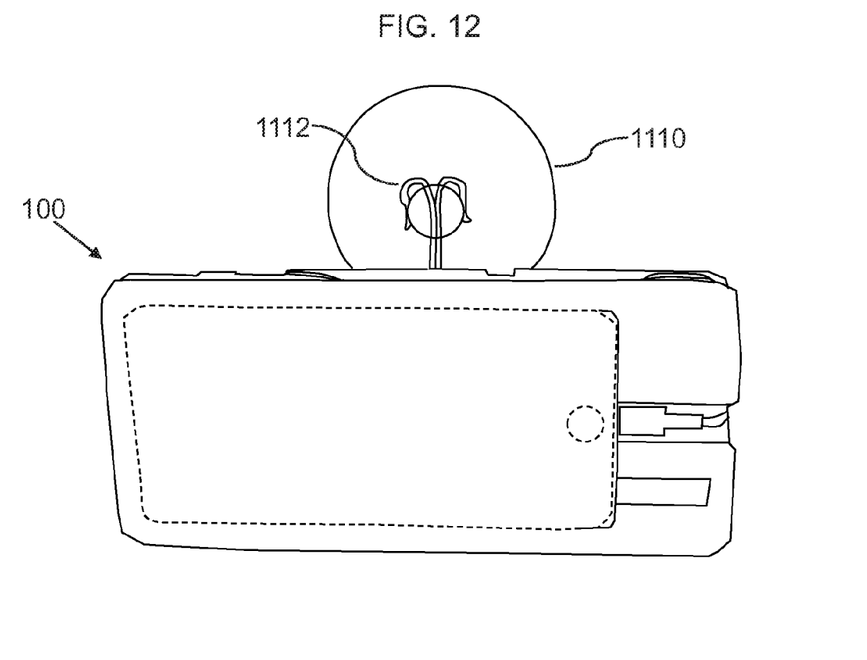
FIG. 12 is a front perspective view of an adaptable mobile phone case, mounted with a phone case holder, according to an embodiment of the invention.

In a related embodiment, as shown in FIG. 11, the phone case can further include a phone case holder 1110 with an attached hook 1112, such that the hook 1112 can attach into the mounting hole 312. As shown in FIG. 11, the phone case holder 1110 can be a suction cup. As shown in FIG. 12, the phone case 100 can thereby be mounted for viewing, such that the phone case holder 1110 is attached to a flat surface, which for example can be an inside surface of the front windshield of a car.

Figure 13:
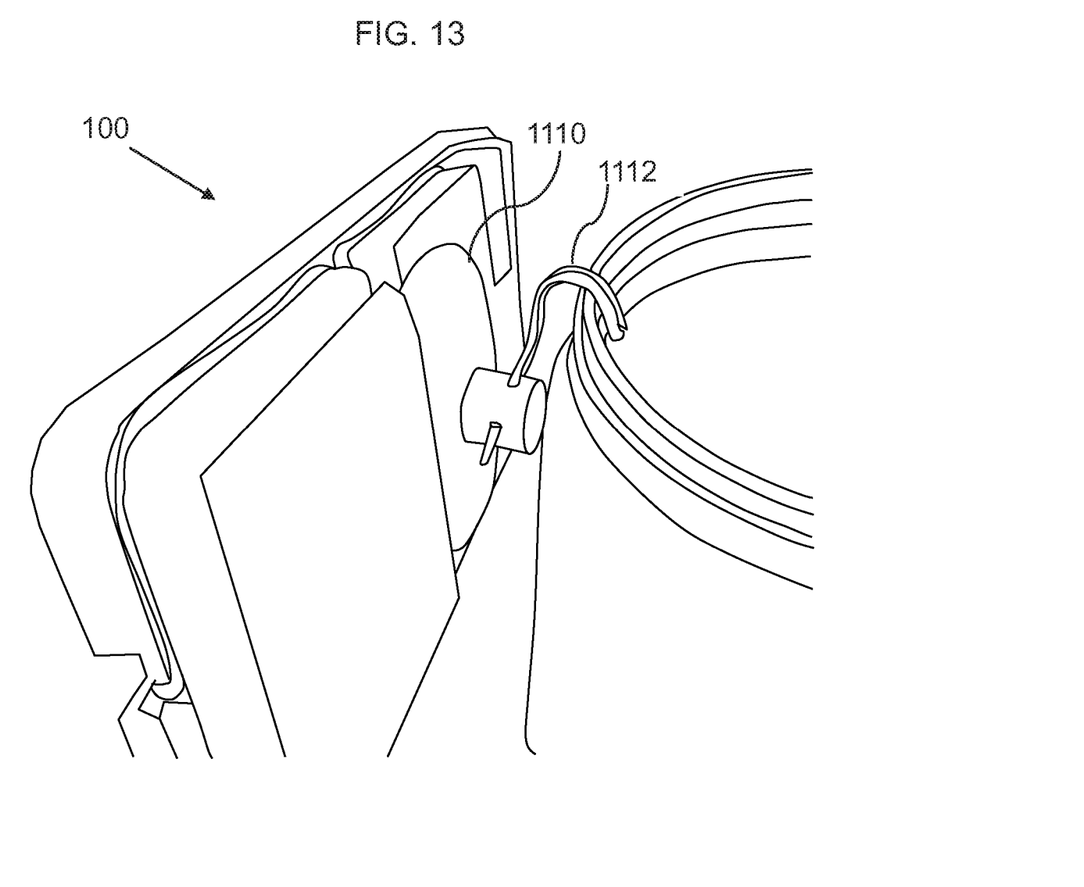
FIG. 13 is a rear side perspective view of an adaptable mobile phone case, reverse mounted with a phone case holder, according to an embodiment of the invention.

In a related embodiment, as shown in FIG. 13, the phone case holder 1110 can instead be attached to a rear side of the phone case 100, such that the attached hook can hang over a horizontal edge in the environment to hold the phone case 100 with a phone 202 for viewing by a user.

In a related embodiment, as shown in FIG. 2, the phone case 100 can further include a speaker cord cavity 230, which is configured in a position such that the speaker cord cavity is in front of a speaker output on the mobile phone 202, when the mobile phone is inserted in the phone cavity 102, and such that the speaker cord cavity 230 can be configured with a size to allow plugging in of a regular speaker cord of the mobile phone 202, thereby allowing the phone case 100 to plug in an external earphone without using a specially configured extension sound plug cord.

In a related embodiment, the phone case 100 can further include an SD Phone Card opening, such that a user can easily eject or insert an SD phone card without removing the case 100 from the phone 202.

In a related embodiment, the phone case 100 can further comprise an AC to DC charger, which is built into an interior of the phone, and charges the phone 202 and removable battery 602 when power plug 120 is plugged into an AC outlet.

In a related embodiment, the removable battery 602 can be removed and replaced with a fully charged battery at any time, or a fully charged removable battery 602 can be removed and replaced with an uncharged or low charge removable battery 602.

In various related embodiment, the phone connection cable 802 can be an original charging and synchronization cable that is delivered with the mobile phone 202.

In a related embodiment, a phone connection cable 802 can for example have a standard-A USB male connector in a first end, which plugs into the extension connection port 412, and a micro USB connector in a second end, which plugs into the mobile phone 202.

In a related embodiment, the phone case 100 can be configured for use with an Apple iPhone™, for example an iPhone 6, such that the storage compartment can store an original Apple Lightning™ to phone connection cable, which can be attached to the extension connection port 412, and then via the extension connection aperture 413 continuing along the cable canal 414, with excess length of cable 802 inserted into the storage compartment 522, via the storage access aperture 416, such that the Lightning connector of the cable 802 is inserted into the Lightning port of the iPhone via the phone connection aperture 110.

In a related embodiment, the phone case 100 can be configured with flat sides 360, shown in FIG. 3, and/or a flat lower end 460, shown in FIG. 4, whereby the phone case 100 can stand on its own in either a horizontal or vertical orientation, for example to allow taking of self-pictures.

Figure 14:
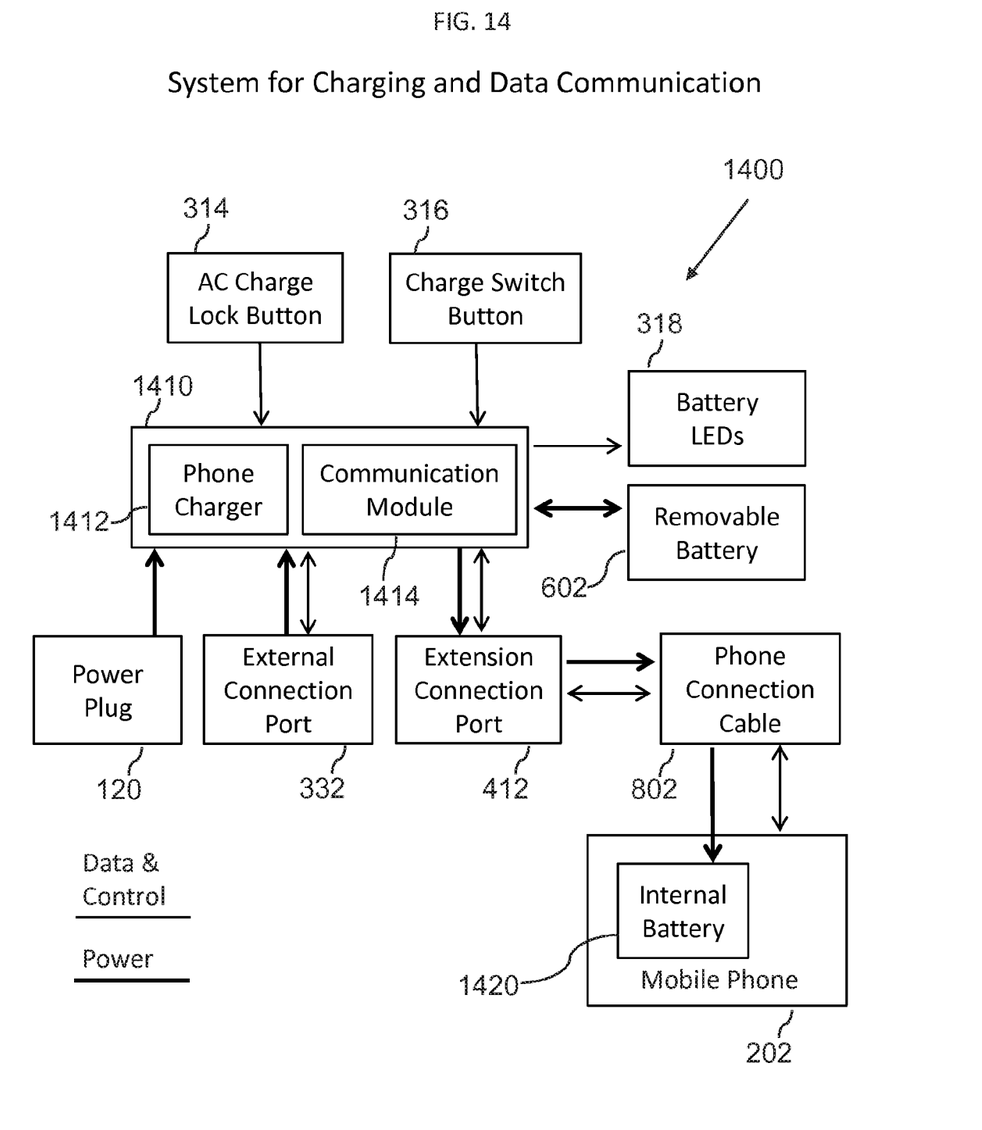
FIG. 14 is a schematic diagram of a phone case system for charging and data communication, according to an embodiment of the invention.

In an embodiment, as shown in FIG. 14, with data and control connections shown in thin lines, and power connections shown in think lines, the phone case 100 can include an inbuilt system for charging and data communication 1400, including:

a. A phone charger and communication module 1410, which includes a phone charger module 1412 that converts external AC power, such as 120-140 volt AC to an internal DC voltage, and a communication module 1414 for transfer of phone control signals;

b. A power plug 120, which is connected to the phone charger and communication module 1410 and provides AC power for charging of the removable battery 602 and the internal battery 1420 of the mobile phone 202;

c. An external connection port 332, which is connected to the phone charger and communication module 1410, and provides DC power for charging of the removable battery 602 and the internal battery 1420 of the mobile phone 202;

d. An extension connection port 412, which is connected to the phone charger and communication module 1410, such that a phone connection cable 802 can be connected in a first end to the extension connection port 412, and in a second end to a mobile phone 202, which is inserted into the phone case 100, such that the phone charger and communication module 1410 is configured to charge the mobile phone 202 and transfer communication between the external connection port 332 and the connected mobile phone 202;

e. A removable battery 602, which is connected to the phone charger and communication module 1410,
such that the phone charger and communication module 1410 is configured to charge the removable battery 602, when the power plug 120 is connected to an external power source, and
such that the phone charger and communication module 1410 is configured to receive DC power from the removable battery 602, when the power plug 120 is not connected to the external power source;

f. A plurality of Battery LEDs 318, which are connected to the phone charger and communication module 1410, such that the phone charger and communication module 1410 is configured to measure the charging completion percentage of the removable battery 602, and indicate the charging completion percentage on the battery LEDs 318; such that for example no lighted LEDs indicate 0% charge and all lighted LEDs indicate 100% charge.

g. A phone charger lock button 314, which is connected to the phone charger and communication module 1410, such that when the phone charger lock button 314 is in an on position, the phone charger and communication module 1410 is configured to stop charging of the internal battery 1420 in the mobile phone when the power plug 120 is connected to an AC outlet, wherein the charger and communication module 1410 is configured to simultaneously allow data to be communicated between the external connection port 332 and the extension connection port 412, which is connected to the phone 202, via the connection cable 802; and h. A manual switch charging button 316, which is connected to the phone charger and communication module 1410, such that when the manual switch charging button 316 is in an on state, the phone charger and communication module 1410 is configured to charge the removable battery 602.

In a related embodiment, when the power plug 120 and the external connection port 332 are both connected to external power sources, the external connection port 332 can override the power plug 120, such that the external connection port 332 charges the removable battery 602 and the internal battery 1420 of the mobile phone 202.

In a another related embodiment, when the power plug 120 and the external connection port 332 are both connected to external power sources, the power plug 120 can override the external connection port 332, such that the power plug 120 charges the removable battery 602 and the internal battery 1420 of the mobile phone 202.

Here has thus been described a multitude of embodiments of the adaptable mobile phone case 100, and systems and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. An adaptable mobile phone case for carrying a mobile phone, comprising:
    a. a main body;
    b. a phone cavity, which is a cavity in a front side of the main body, wherein the phone cavity is configured to contain the mobile phone;
    c. a rotatable power plug, which is mounted on a rear left side of the phone case, wherein the rotatable power plug is configured to rotate from a folded in position to a fully extended position;
    d. a storage compartment, which is a cavity on a rear side of the main body;
    e. a removable compartment lid, which covers the storage compartment;
    f. a phone charger module, which is mounted inside the main body, such that the phone charger module is connected to the rotatable power plug; and
    g. an extension connection port, which is connected to the phone charger module;
    wherein the adaptable mobile phone case is configured to charge the mobile phone via a phone connection cable that is connected from the phone charger module to the mobile phone, when the rotatable power plug is connected to a power outlet;
    such that the phone connection cable is connected in a first end to the extension connection port, and in a second end to the mobile phone, such that the phone charger is configured to charge the mobile phone.

2. The adaptable mobile phone case of claim 1, further comprising:
    a. a phone case holder, which is configured to attach to a surface;
    b. a hook, which is connected to the phone case holder;
    c. a mounting hole, in a surface of the mobile phone case;
    wherein the hook is attached into the mounting hole.

3. The adaptable mobile phone case of claim 1, further comprising:
    an external connection port, which is connected to the phone charger;
    wherein the phone charger module is configured to charge the mobile phone with direct current provided via the external connection port.

4. The adaptable mobile phone case of claim 1, further comprising:
 a removable battery, which is mounted in the storage compartment, such that the removable battery is connected to the phone charger;
 wherein the phone charger is configured to charge the removable battery, when the power plug is connected to an external power source; and
 wherein the phone charger is configured to receive direct current from the removable battery, when the power plug is not connected to the external power source.

5. The adaptable mobile phone case of claim 4, further comprising:
 a plurality of battery LEDs, which are connected to the phone charger;
 such that the phone charger is configured to measure the charging completion percentage of the removable battery, such that the phone charger indicates the charging completion percentage on the battery LEDs.

6. The adaptable mobile phone case of claim 3, further comprising:
 a phone charger and communication module, comprising the phone charger module and a communication module for transfer of phone control signals;
 wherein the phone charger and communication module is configured to transfer communication between the external connection port and the connected mobile phone, via the phone connection cable.

7. The adaptable mobile phone case of claim 3, further comprising:
 a phone charger lock button, which is connected to the phone charger and communication module;
 wherein the phone charger and communication module is configured to stop charging of the mobile phone, when the phone charger lock button is in an on position and the power plug is connected to an AC outlet.

8. The adaptable mobile phone case of claim 4, further comprising:
 a manual switch charging button, which is connected to the phone charger and communication module;
 wherein the communication module is configured to charge the removable battery, when the manual switch charging button is in an on state.

9. The adaptable mobile phone case of claim 6, further comprising:
 a cable canal, which extends along a side surface and a bottom surface of the phone case;
 wherein the cable canal is configured such that the phone connection cable is connected from the extension connection port to a connection point on a lower end of the mobile phone, which is positioned in the phone cavity, such that the phone connection cable fits in the cable canal.

10. The adaptable mobile phone case of claim 9, further comprising:
 a storage access aperture, which is an aperture from the cable canal to the storage compartment;
 whereby an excess length of the phone connection cable is inserted in the storage compartment.

11. The adaptable mobile phone case of claim 1, wherein the power plug is configured to function as a stand, such that the power plug is rotated to allow the phone case to rest at a leaning angle.

12. The adaptable mobile phone case of claim 9, further comprising:
 a. a top side aperture, in a top side of the adaptable mobile phone case; and
 b. a removable top side cover;
 wherein the top side aperture is configured to allow the mobile phone to slide in to the phone cavity, and wherein the top side cover is attached over the top side aperture.

13. The adaptable mobile phone case of claim 2, wherein the phone case holder is attached to a rear side of the mobile phone case, such that the attached hook hangs over an edge in the environment to hold the adaptable mobile phone case.

14. The adaptable mobile phone case of claim 1, wherein the main body is further configured with substantially flat sides and a substantially flat lower end, such that the adaptable mobile phone case stands on its own in both a horizontal and a vertical orientation.

15. The adaptable mobile phone case of claim 1, further comprising:
 a cable holder plate;
 wherein the cable holder plate is configured to allow tight wrapping of the connection cable, such that the cable holder plate with the connection cable fits inside the storage compartment.

16. The adaptable mobile phone case of claim 1, wherein the removable compartment lid further comprises:
 a credit card pocket, which is configured as a flat cavity inside the compartment lid, with a narrow elongated aperture in a side of the compartment lid;
 wherein the removable compartment lid is configured to allow entry of a plurality of credit cards into the credit card pocket.

17. The adaptable mobile phone case of claim 1 further comprising:
 the phone connection cable;
 wherein the phone connection cable is connected in the first end to the extension connection port, and in the second end to the mobile phone.

18. The adaptable mobile phone case of claim 1, further comprising:
 a speaker cord cavity, which is configured in a position such that the speaker cord cavity is in front of a speaker output on the mobile phone, when the mobile phone is inserted in the phone cavity.

19. The adaptable mobile phone case of claim 1, wherein the external connection port is a female micro USB port.

20. The adaptable mobile phone case of claim 3, wherein the extension connection port is a female standard-A USB port.

21. A phone case system for charging and data communication, comprising:
 a. a power plug;
 b. a phone charger module, which is connected to the power plug;
 c. an extension connection port, which is connected to the phone charger module, such that a phone connection cable is connected in a first end to the extension connection port, and in a second end to a mobile phone, such that the phone charger is configured to charge the mobile phone;
 d. an external connection port, which is connected to the phone charger, wherein the phone charger is configured to charge the mobile phone with direct current provided via the external connection port.

22. The phone case system for charging and data communication of claim 21, further comprising:
 a removable battery, such that the removable battery is connected to the phone charger;

wherein the phone charger is configured to charge the removable battery, when the power plug is connected to an external power source; and wherein the phone charger is configured to receive direct current from the removable battery, when the power plug is not connected to the external power source.

23. The phone case system for charging and data communication of claim 22, further comprising:

a plurality of battery LEDs, which are connected to the phone charger;

such that the phone charger is configured to measure the charging completion percentage of the removable battery, such that the phone charger indicates the charging completion percentage on the battery LEDs.

24. The phone case system for charging and data communication of claim 21, further comprising:

a communication module, which is connected to the external connection port and the extension connection port;

wherein the communication module is configured to transfer communication between the external connection port and the connected mobile phone, via the phone connection cable.

25. The phone case system for charging and data communication of claim 21, further comprising:

a phone charger lock button, which is connected to the phone charger;

wherein the phone charger is configured to stop charging of the mobile phone, when the phone charger lock button is in an on position and the power plug is connected to an AC outlet.

26. The phone case system for charging and data communication of claim 22, further comprising:

a manual switch charging button, which is connected to the phone charger;

wherein the communication module is configured to charge the removable battery, when the manual switch charging button is in an on state.

27. An adaptable mobile phone case for carrying a mobile phone, comprising:

a. a main body;

b. a phone cavity, which is a cavity in a front side of the main body, wherein the phone cavity is configured to contain the mobile phone;

c. a rotatable power plug, which is mounted on a rear left side of the phone case, wherein the rotatable power plug is configured to rotate from a folded in position to a fully extended position;

d. a storage compartment, which is a cavity on a rear side of the main body;

e. a removable compartment lid, which covers the storage compartment, wherein the removable compartment lid further comprises:

a credit card pocket, which is configured as a flat cavity inside the compartment lid, with a narrow elongated aperture in a side of the compartment lid, wherein the removable compartment lid is configured to allow entry of a plurality of credit cards into the credit card pocket; and f. a phone charger module, which is mounted inside the main body, such that the phone charger module is connected to the rotatable power plug;

wherein the adaptable mobile phone case is configured to charge the mobile phone via a phone connection cable that is connected from the phone charger module to the mobile phone, when the rotatable power plug is connected to a power outlet.

* * * * *